UNITED STATES PATENT OFFICE.

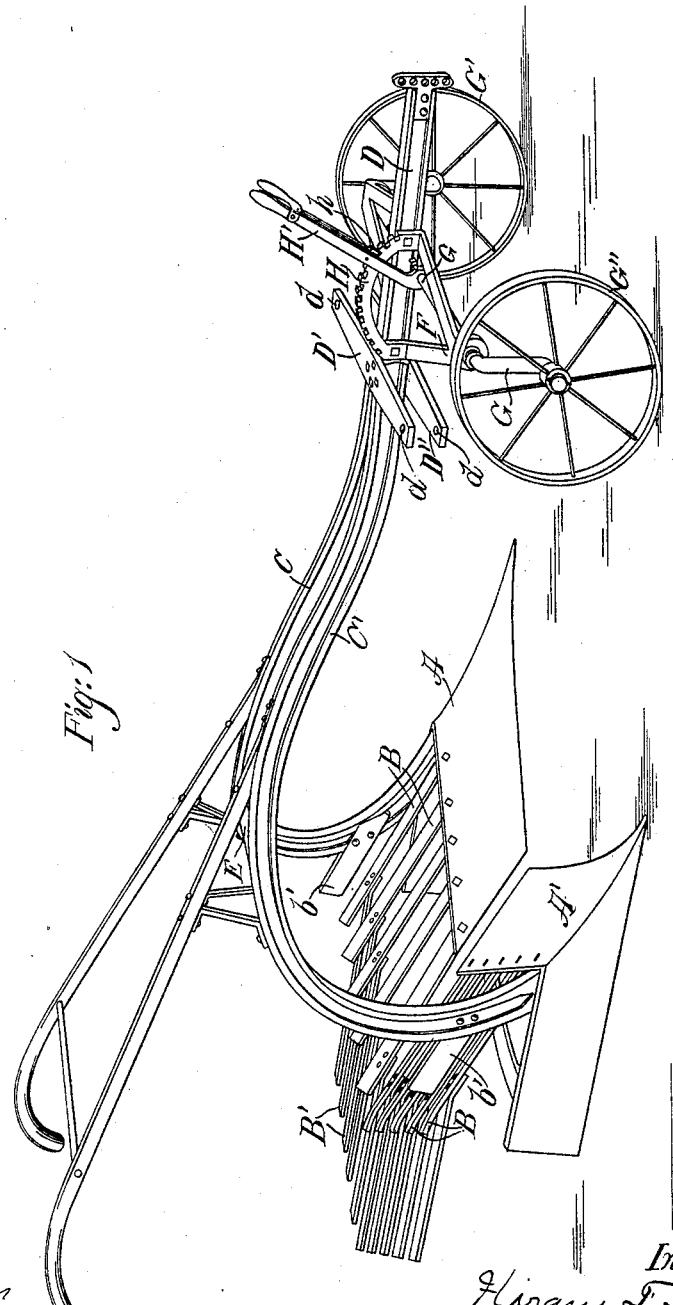

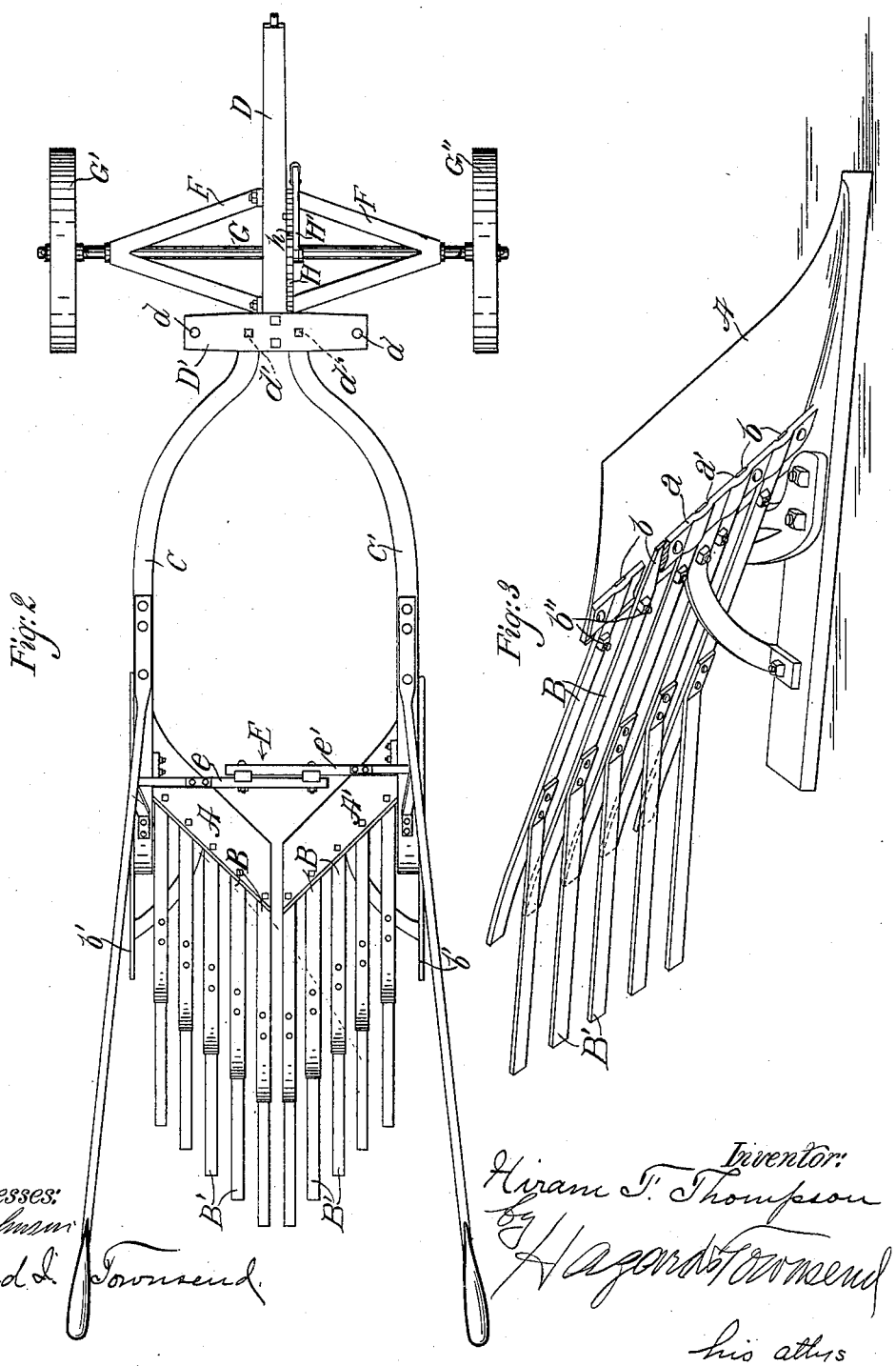

HIRAM F. THOMPSON, OF SPRINGVILLE, CALIFORNIA.

COMBINED POTATO AND BEET DIGGER.

SPECIFICATION forming part of Letters Patent No. 593,384, dated November 9, 1897.

Application filed November 16, 1896. Serial No. 612,342. (No model.)

*To all whom it may concern:*

Be it known that I, HIRAM FRANCIS THOMPSON, a citizen of the United States, residing at Springville, in the county of Ventura and State of California, have invented a new and useful Combined Potato and Beet Digger, of which the following is a specification.

In digging potatoes by horse or other power great difficulty is encountered in providing a digger which will thoroughly clean the potatoes from the dirt without clogging the machine by reason of vines and trash catching in that portion of the machine which separates the potatoes from the fine dirt.

In digging potatoes the ground is very often cloddy, and in such case the end sought is to separate the potatoes and clods from the fine dirt and to leave them upon the top of the ground, so the potatoes can be quickly gathered and sacked. Unless the ground is agitated or shaken during its passage through the digger so much fine dirt will remain with the clods and potatoes as to cover the potatoes after they finally are left behind the machine, and heretofore in providing means for agitating the dirt such means have furnished a lodging-place for weeds and vines which soon clog the machine.

One object of my invention is to provide a potato-digger which will remove the potatoes from the ground in an effective and expeditious manner and without bruising them and in which all liability of clogging the digger by vines or other trash will be entirely avoided.

A further object of my invention is to provide a digger which may be used for digging potatoes and by a slight rearrangement may be adapted for the purpose of digging sugar-beets.

A further object of my invention is to provide simple and effective means whereby the cleaning-fingers may be quickly and rigidly secured to the shares of the digger.

My invention comprises the various features of construction and combinations of parts hereinafter fully set forth and claimed whereby I accomplish the various objects above set forth.

The accompanying drawings illustrate my invention.

Figure 1 is a perspective side elevation of a potato-digger embodying my invention. Fig. 2 is a plan view of my improved digger. Fig. 3 is a bottom view of one of the shares, showing the means of securing the fingers to the share.

In the drawings, A and A' represent, respectively, a right and a left hand plowshare. These shares are oppositely arranged, so that thereby as the share passes along beneath the ground the tendency is to prevent the dirt from being thrown in either direction, but is to simply lift it up and leave it practically smooth and level after the digging is accomplished. To the under side of each share is secured a strengthening-strap $a$, which is provided with tapering sockets $a'$, within which seat the tapering ends $b$ of the fingers B. Each finger is provided with a bolt-hole, and after the tapering lower end of the finger is driven into the socket a bolt $b''$ is passed through the bolt-hole in the finger and through a bolt-hole in the share, thus rigidly securing the finger in the socket. By means of the sockets the fingers are brought into proper position with relation to each other and when secured by the bolts are held so firmly there is no liability whatever of their becoming loosened or shifting from such position even under severe strain.

In order to cause an agitation of the dirt passing over the fingers and to thereby more effectually separate the clods and potatoes from the dirt, I arrange the fingers in two series B and B', one above the other, so that the dirt and potatoes will drop from the higher fingers to the lower ones, thus to be thoroughly agitated and to allow all fine dirt which will pass between the fingers to be screened from the potatoes and clods. The series B are secured to the share and are inclined upward toward the rear, and the series B' are practically horizontal, but preferably inclined slightly from the front toward the rear. In order to avoid the presence of any cross-bars which would obstruct the passage of the vines or weeds through the machine, I secure the fingers B' one to the under face of each of the fingers B. Each finger B' is secured to its respective inclined finger at a point below the top thereof, so that when the dirt and potatoes pass upward over the tops of the inclined fingers they drop a distance of about two inches upon the fingers B', and the dirt is thus agitated and broken sufficiently to cause the fine dirt to drop through the fingers and allow the clods and potatoes to pass toward the rear off of fingers and be left upon the top of the fine dirt. The drop is not sufficient to bruise the potatoes, but is enough to effectively separate the fine dirt therefrom.

In order to adapt my machine for digging beets, I provide the shares A A' with independent beams C and C', which are respectively secured to the landsides of the shares and are curved inward toward the front and have their front ends secured together by suitable adjustable means, whereby the distance between them may be regulated. As shown in the drawings, I have provided a short stub or main beam D, which has at its rear end two adjusting-plates D' and D'', which project outward upon each side of the beam and are adapted to receive between them the ends of the beams C and C'. The adjusting-plates are provided in each end with bolt-holes $d$ and $d'$, so that the ends of the beams C and C' may be secured close together to bring the shares close together for digging a single row of potatoes or spread wide apart to adapt the machine for digging two rows of beets at the same operation. The rear portions of the beams are secured together by means of an adjustable bracket E. This bracket is composed of two members $e$ and $e'$, respectively secured to the beams C and C', and are provided with bolt-holes, whereby the rear portions of the beams may be spread apart to correspond with the front portions of the beams when such beams are spread apart. Thus when it is desired to use the digger for beets the fingers B and B' are removed from the shares, and by adjusting the beams the shares are spread apart, so that each share will dig one row of beets. It is to be understood that in digging sugar-beets it is advantageous to run the share beneath the surface and cut the tap-roots at a proper depth without throwing the beets out of the ground. With my improved digger this is possible, and the beets are left standing in the ground as when growing and are thereby protected from the action of the sun, so if not immediately removed from the field after digging they are not subject to the deterioration which takes place when the beets are badly wilted. By leaving the beets in place in the ground after the tap-roots are severed the temperature of the beet is maintained below that which is possible when the beets are wholly removed from the ground and exposed to the full effect of the sun. Still by cutting the tap-root and stirring the soil by the passage of the share therebeneath I leave the beets perfectly free to be lifted from the ground when it is desired to haul them from the field. The two shares are not connected with each other, but a space is left between them. This is necessary in order to effectually prevent clogging of the cutters, the inclination of the cutters or shares causing any tough roots or trash which may catch upon the edge of the cutters and not be entirely severed thereby to work inward toward the rear and finally pass off of the edge of the share between the ends thereof. If the two shares are connected together, this matter will catch within the angle and in a short time will clog the cutters to such an extent as to render it necessary to remove them from the ground for the purpose of cleaning them.

In order to provide simple and convenient means whereby to regulate the depth at which the shares run beneath the surface of the ground, I secure a suitable bracket-frame F to the stub or main beam D, and in this bracket-frame I journal a crank-axle G, which has suitable supporting-wheels G' G'' journaled upon its crank-arms. To the beam D is secured an arc-rack H, and to the axle G is secured an operating-lever H', which is provided with a pawl $h$, adapted to engage with the arc-rack H. The bracket-frame F extends outward a short distance upon each side of the beam in order to give a sufficient distance between the axle-bearings to avoid cramping and consequent friction when strain is placed upon the beam by one share tending to run deeper than the other.

The fingers B and B' are preferably flat, since I find that this shape gives superior results, in that if the fingers are round potatoes and clods are much more liable to wedge therebetween. It will be found advantageous if the opposing edges of the fingers slightly diverge toward the ground, so that anything which will pass between the upper edges of the fingers will find free escape therebelow.

By arranging the two shares in V shape the tendency of each share is to crowd outward, thus holding the digger steady, and since the tendency of each share is to throw the dirt inward they counteract each other, and in place of turning a furrow each share simply passes along beneath the surface of the soil, raises the soil upward a slight distance, after which the fingers pass beneath it, allowing all fine dirt to fall through the fingers, so that clods and potatoes are left upon the surface of the ground.

In order to prevent any potatoes from escaping sidewise, I secure short landside fingers or guards $b'$ $b'$ to the beams C C', respectively. These fingers are flat, and are only of sufficient length to prevent the potatoes from rolling sidewise off of the fingers B, they having no tendency to roll sidewise off of the fingers B'.

It will be observed that by attaching the rear series of fingers to the front series of fingers and by attaching the landside-fingers to the beams I entirely avoid all cross-bars, so that weeds and vines the tap-roots of which are cut out by the shares pass freely through the fingers. I have found in practical operation that where weeds and vines are not too large to pass freely beneath the beams it is impossible to clog the digger. Furthermore, with my digger the ground is left perfectly smooth and level, so that future cultivation of the land is facilitated by the use of my machine. When used for digging beets, excepting for the marks left by the passage of the beams through the soil it is practically impossible to distinguish whether the digger has or has not been used. This is not only advantageous in that it avoids much labor in again placing the land in condition for planting, but also in that no ruts or furrows are present to render difficult the passage of wagons in hauling the crop from the field.

Now, having described my invention, what I claim as new, and desire to secure by Letters Patent, is—

1. A potato-digger provided with a series of inclined fingers; a series of practically horizontal fingers, one secured to each of the inclined fingers, and arranged below the upper ends or tops of such fingers, whereby potatoes and dirt passing over the top of the inclined fingers will fall upon the horizontal fingers.

2. In a potato-digger, the combination set forth of a share; rearwardly-projecting fingers secured to the share and comprising two series, the front being upwardly inclined toward the rear, and the rear series being secured to the under faces of the inclined fingers and arranged at a distance below the tops of such fingers.

3. In a potato-digger, the combination set forth of a right and left hand share arranged in V shape; upwardly-inclined fingers secured to each share and projecting toward the rear; rearwardly-projecting horizontally-arranged fingers, one secured to the under face of each inclined finger at a distance below its upper or rear end; a beam secured to each share; and means connecting the beams with each other.

4. In a digger, the combination set forth of the right and left hand shares arranged in V shape; a beam secured to the landside of each share, curved inward toward the front; a main beam arranged at the front ends of the two beams and provided with the adjusting-plates adapted to receive between them the ends of the share-beams; bolts passing through the adjusting-plates and through the front ends of the beams; and an adjustable bracket connecting the rear portions of the beams with each other.

H. F. THOMPSON.

Witnesses:
ALFRED I. TOWNSEND,
JAMES R. TOWNSEND.